United States Patent [19]

Froumajou

[11] 3,793,897
[45] Feb. 26, 1974

[54] TRANSMISSION ASSEMBLY IN PARTICULAR FOR A VEHICLE

[75] Inventor: Armand Froumajou, Pontoise, France

[73] Assignees: Automobile Peugeot, Paris; Regie National Des Usines Renault, Billancourt, both of, France

[22] Filed: Sept. 29, 1972

[21] Appl. No.: 293,565

[30] Foreign Application Priority Data
Nov. 15, 1971 France .............................. 71.41289

[52] U.S. Cl. ................................................. 74/199
[51] Int. Cl. ............................................ F16h 15/08
[58] Field of Search..... 74/199, 202, 230.17 F, 205, 74/730

[56] References Cited
UNITED STATES PATENTS

| | | | |
|---|---|---|---|
| 2,177,011 | 10/1939 | Whitehead............................ | 74/730 |
| 2,536,737 | 1/1951 | Gerst .................................... | 74/730 |
| 2,844,973 | 7/1958 | Hill ....................................... | 74/730 |
| 3,670,586 | 6/1972 | Falay et al. ........................... | 74/199 |

Primary Examiner—Benjamin W. Wyche
Attorney, Agent, or Firm—Burns, Doane, Swecker & Mathis

[57] ABSTRACT

Transmission assembly comprising a coupling device, a friction speed variator including a hydraulic actuating device and an input shaft driven by the coupling device and an output shaft, two gears respectively integral with the input shaft and output shaft, motion-reversing gear means capable of engaging the two gears for reverse speed operation of the transmission assembly, and control means comprising valve means controlling the hydraulic actuating device and a manually-controlled selector lever for shifting the motion-reversing gear means and shifting the valve. The selector lever is capable of occupying at least three positions namely a neutral position, a forward speed position and reverse speed position and passes through an intermediate position between neutral position and reverse speed position in which intermediate position the valve brings the hydraulic actuating device into action.

3 Claims, 5 Drawing Figures

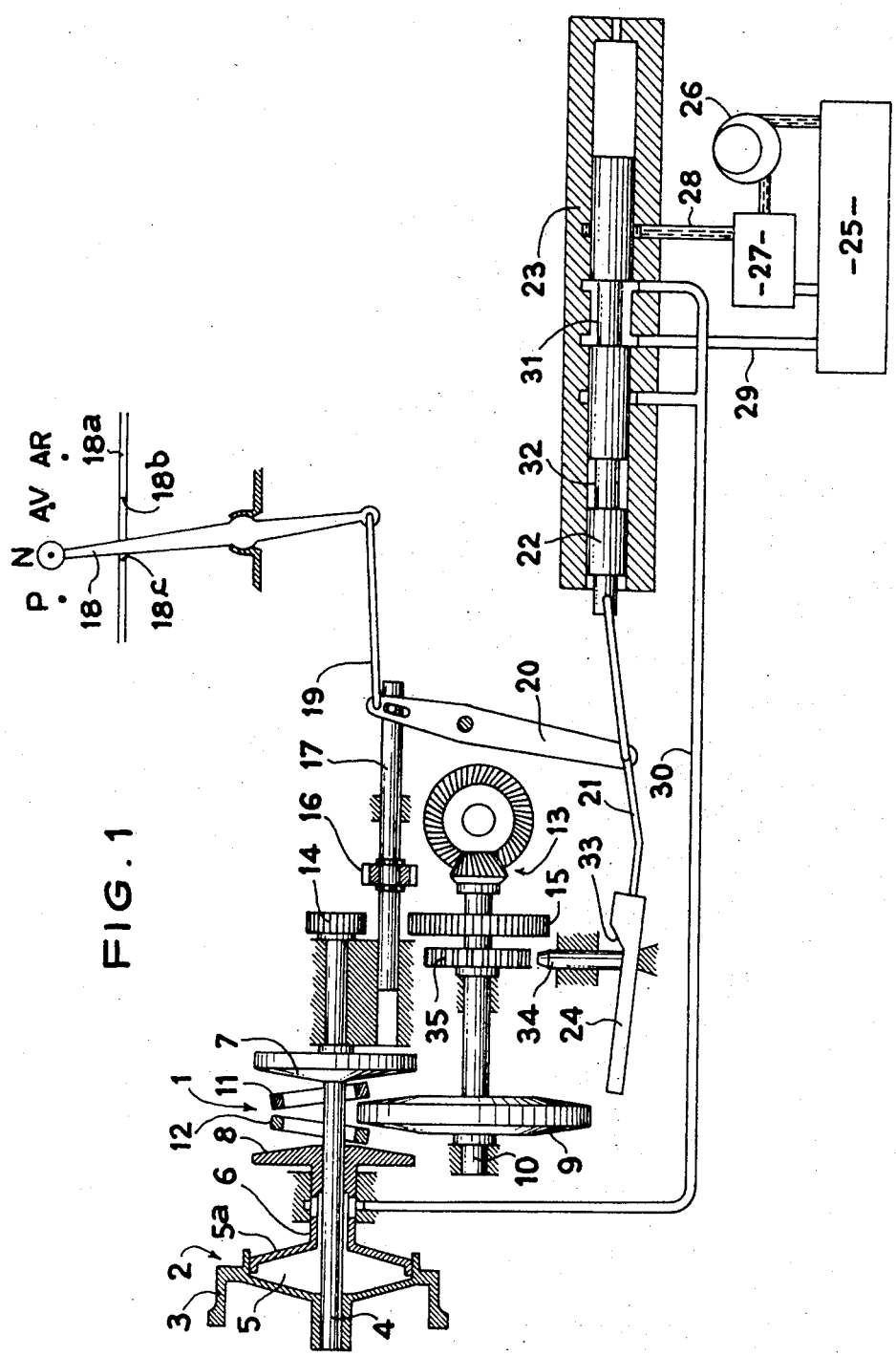

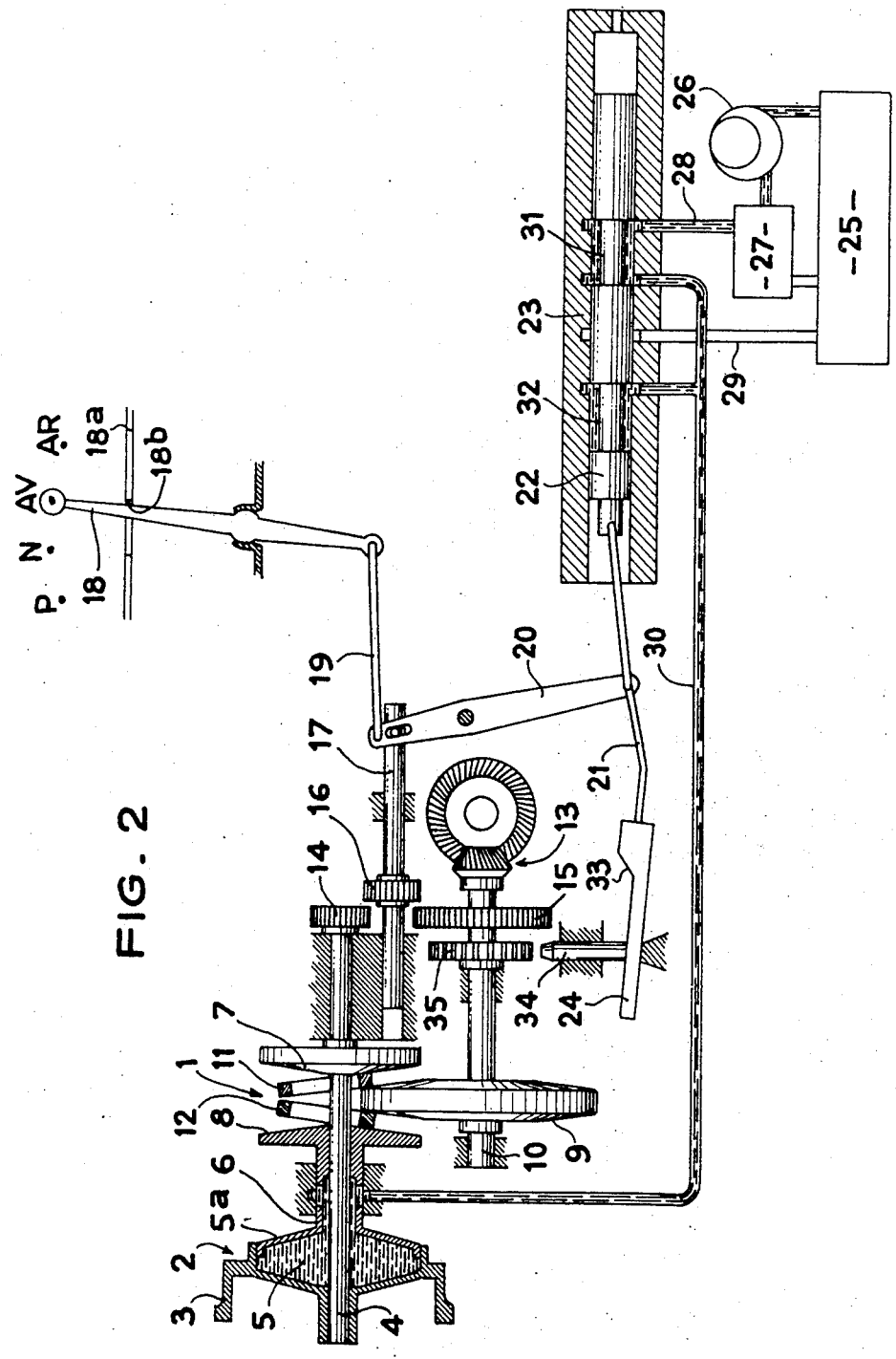

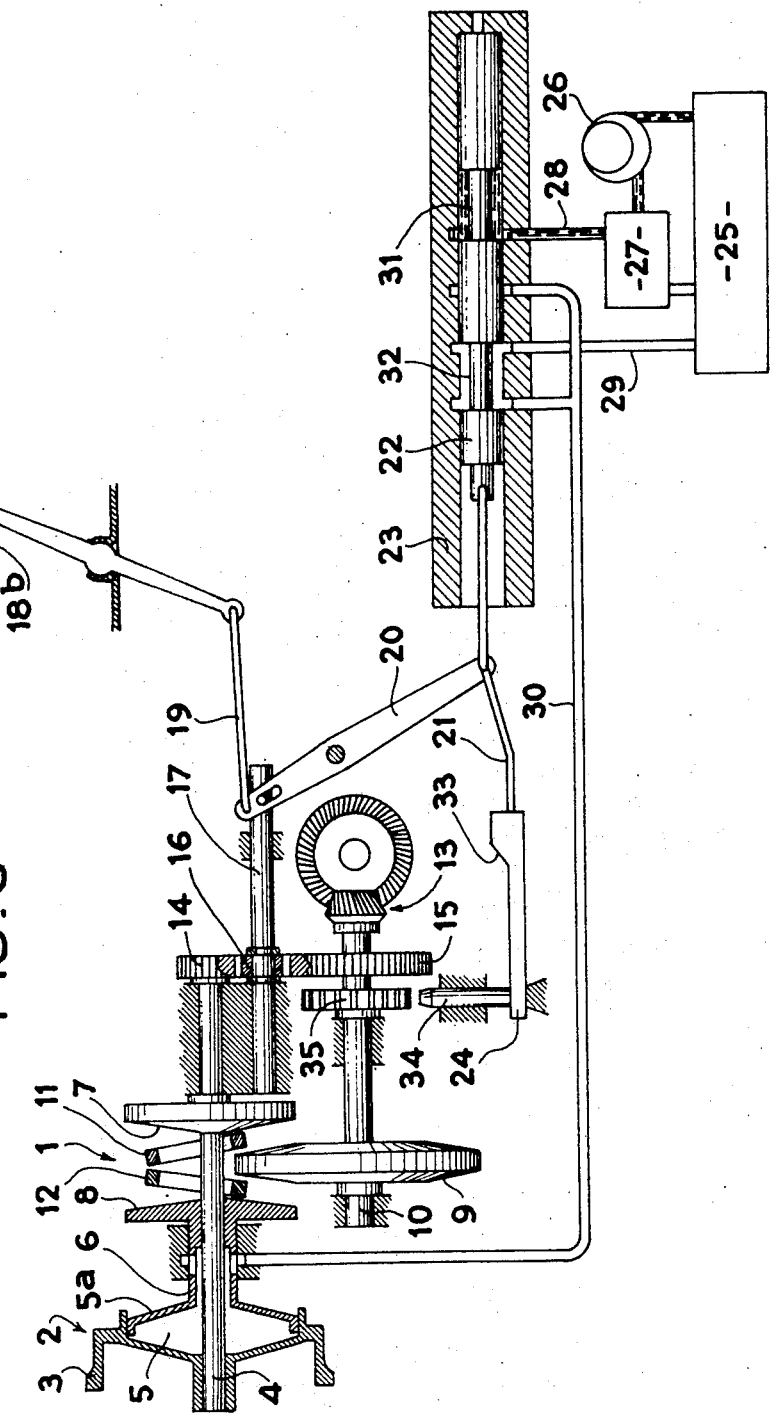

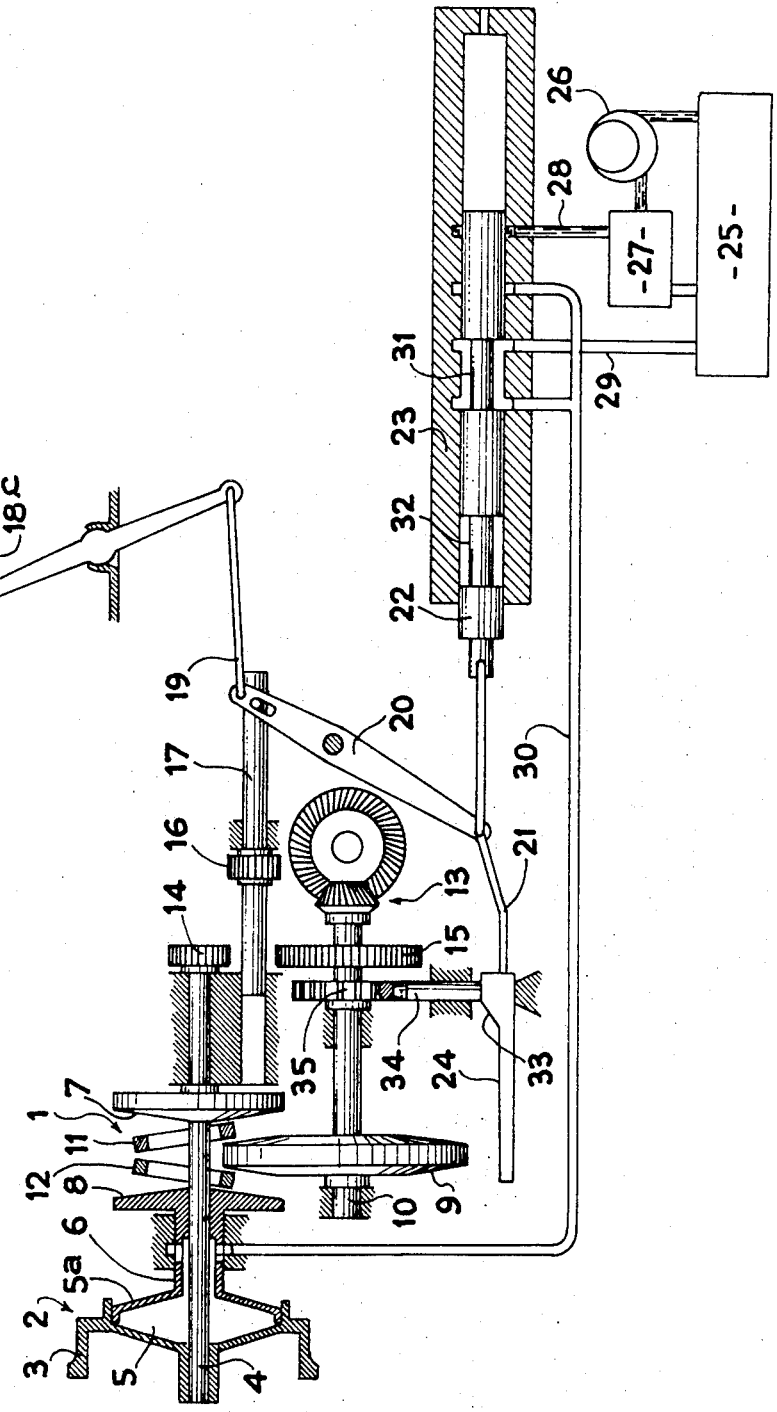

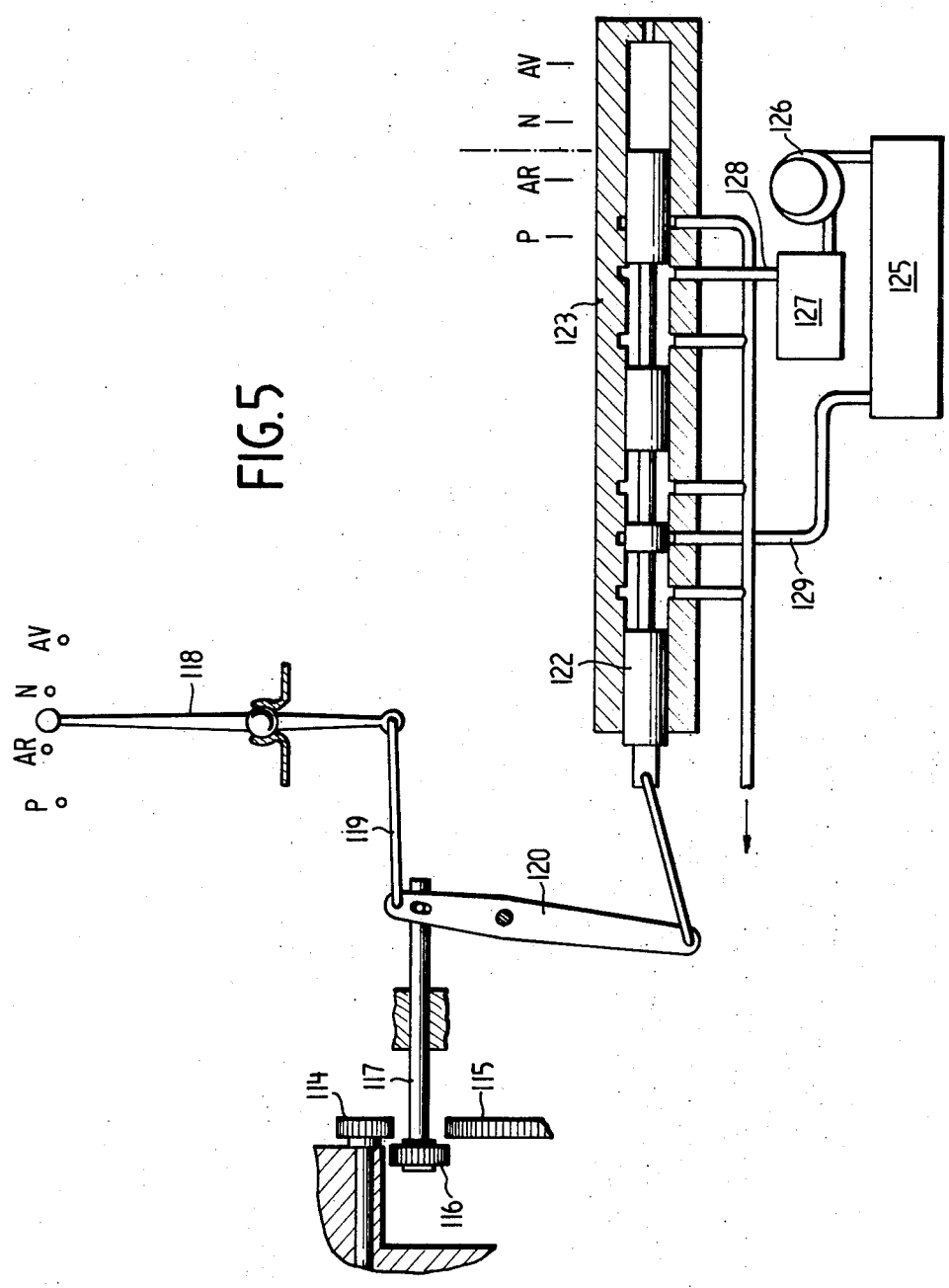

TRANSMISSION ASSEMBLY IN PARTICULAR FOR A VEHICLE

The present invention relates to transmission means for automobile vehicles of the type comprising a friction speed variator and affords means for engaging the reverse speed ratio in such a transmission assembly.

It is known that when a speed variator is provided in an automobile vehicle, it is usually connected to the engine through a coupling device such as a torque converter or a centrifugal clutch, in order to achieve completely automatic operation and avoid a clutch pedal. Unfortunately, in such an arrangement, the reverse speed presents serious problems. Indeed, in the case of a centrifugal clutch, the starting up of the engine is accompanied by a rise in engine speed which causes the driving of the receiving element of the clutch. When the engine speed drops, the declutching is effectively produced but the receiving element, although disconnected, continues to rotate owing to its high inertia so that it is very difficult, and even impossible, during a variable period of time to engage a motion reversing means, such as a gear pinion or a reversing dog clutch.

When the coupling is a torque converter there is a drag torque which, even at low operating speeds, renders this engagement impossible.

In both cases, the utilisation of a simple synchronizer does not solve the problem since the torque to brake is too great.

An object of the invention is to ensure that the input shaft of the speed variator is held stationary prior to the engagement of a reverse speed motion-reversing means, this being achieved by simple and cheap means.

The invention provides a transmission assembly in particular for a vehicle comprising a coupling device, a friction speed variator provided with a hydraulic actuating device and including an input shaft driven by the coupling device and an output shaft, a reverse speed motion-reversing means adapted to be engaged between two gears carried respectively by the input shaft and output shaft of the variator so as to engage the reverse speed, and a control means including a valve controlling the supply of the fluid to the hydraulic actuating device and a manually-controlled selector lever which actuates the motion-reversing means and the valve and is capable of occupying at least three positions, namely neutral, forward speed and reverse speed position, wherein between the neutral position and the reverse speed position the selector lever moves through an intermediate position in which the valve is placed in such position that the hydraulic actuating device is brought into action.

According to a preferred embodiment, said intermediate position is the forward speed position, known means being provided for preventing the selector lever from moving accidentally from the forward speed position to the reverse speed position.

Further features and advantages of the invention will be apparent from the ensuing description with reference to the accompanying drawings.

In the drawings:

FIGS. 1–4 are diagrams of the transmission assembly in its various possible positions, namely: neutral, forward speed, reverse speed and parking position.

FIG. 5 is a schematic view of a modified form of the transmission assembly, in which the neutral position is located between forward speed and reverse speed positions.

In the transmission assembly shown in FIGS. 1–4, a friction variator 1 is connected to the engine crankshaft (not shown) through a centrifugal clutch 2. This variator can be, for example, of the type in which a receiving pulley 3 of the clutch is integral with a first or input shaft 4 of the variator and includes a hydraulically-controlled clutch applying cylinder device 5 the piston 5a of which is integral with a sleeve 6 slidable on the shaft 4 with which it rotates. Two conical plates 7 and 8 are integral with the shaft 4 and the sleeve 6 respectively. These plates are placed on each side of a third biconical plate 9 integral with a second or output shaft 10. Rings 11, 12 surround the shaft 4 and are disposed between the confronting faces of the plates 7 and 8 and plate 9 so that their axis, which is contained in a plane containing the axes of the shafts 4 and 10, is perpendicular to the generatrices of the facing plates. Means (not shown) permit displacing, together, the two rings 11 and 12 along the generatrices of the plates. This type of variator has been chosen merely by way of example and may be replaced by any other known variator.

The output shaft 10 of the variator is connected through any suitable means to a differential 13 connected to the driving wheels of the vehicle (not shown).

A gear 14 integral with the shaft 4 and a gear 15 integral with the shaft 10 are capable of meshing with a reversing sliding gear 16. The gear pinion 16 is freely rotatable on a slidable shaft 17 which is shifted by a manually-controlled selector lever 18 through a rod 19 and a pivotal lever 20. The lever 18 is capable of occupying four positions, namely: parking P, neutral N, forward speed AV, reverse speed AR. Suitable conventional means are provided for preventing the lever 18 from being brought unintentionally to the parking or reverse speed position. These means may comprise a guide slot 18a having two steps, namely a step 18b between the AV and AR positions and a step 18c between the positions N and P.

The lever 20 is pivoted to a rod 21 which is connected to a slide member 22 of a hydraulic valve 23 and to a key 24.

The valve 23 is supplied with liquid under pressure from a tank 25 through a pump 26, a regulator 27 and a conduit 28. It is also directly connected to the tank by way of a discharge conduit 29 and connected to the cylinder device 5 for actuating the variator 1 by way of a conduit 30. Two recesses 31 and 32 formed in the slide member 22 ensure communication between two of the conduits leading to the valve 23.

The key 24 has a ramp 33 for shifting a pawl 34 for holding stationary a gear 35 integral with the shaft 10 of the variator.

This transmission assembly operates in the following manner:

In the position shown in FIG. 1, the selector lever 18 is in the neutral position. In this position, the recess 31 of the slide member 22 interconnects the conduits 29 and 30 and puts the cylinder device 5 in communication with the discharge and the plates 7 and 9 are not urged against the rings 11 and 12, the reversing gear 16 is disengaged from the gears 14 and 15 and the pawl 34 is not engaged with the gear 35.

In FIG. 2, the selector lever 18 is in the forward speed position. In this case, the recess 31 of the slide member 2 interconnects the conduits 28 and 30 and puts the cylinder device 5 under pressure and the plates 7, 8 and 9 are urged against the rings 11 and 12. When the engine speed is sufficient, the torque is transmitted through the clutch 2, the variator 1 and the differential 13 to the vehicle wheels which are driven in the direction for forward motion. The reversing gear 16 is still disengaged from the gears 14 and 15. The pawl 34 is not engaged with the gear 35.

In FIG. 3, the transmission assembly is shown with the selector lever 18 in the reverse speed position. In this position, the recess 32 of the slide member 22 interconnects the conduits 29 and 30 and puts the cylinder device 5 in communication with the discharge, with the same results as that obtained in the case shown in FIG. 1. The reversing gear 16 is engaged with the gears 14 and 15.

When the engine speed is sufficient, the torque is transmitted through the clutch 2, the gears 14, 15 and 16 and the differential 13 to the vehicle wheels which are driven in the direction for reverse motion. The pawl 33 is not engaged with the gear 34.

FIG. 4 shows the transmission assembly when the selector lever 18 is in the parking position. In this case, the recess 31 of the slide member 22 interconnects conduits 29 and 30 and puts the cylinder device 5 in communication with the discharge. The pinion 16 is not engaged with the gears 14 and 15. The ramp 44 of the key 34 urges the pawl 34 into locking engagement with the gear 35.

It can be seen that in order to pass from the neutral position to the reverse speed position, it is necessary to shift the selector lever 18 through the forward speed position. In the course of this movement, the cylinder device 5 is put under pressure and this causes the discs 7, 8 and 9 and the rings 11 and 12 to be urged against each other. As the disc 9 connected to the vehicle wheels is stationary owing to the fact that the shifting of the gears to reverse speed occurs only when the vehicle is stationary, the shaft 4 is braked and held stationary if the shaft 4 would have been driven in rotation owing to the inertia of the pulley 3. The gears 14 and 15 are both stationary and the engagement of the gear 16 therewith can be achieved easily and without any cracking sound.

It will be clear that the desired result may also be obtained in a different order of the positions of the selector lever 18 and in particular when the neutral position is between the forward speed position and reverse speed position. In this case, an additional operational sequence has to be incorporated in the valve 23 so as to put the cylinder device 5 temporarily under pressure for a position of the selector lever 18 which is intermediate between the neutral position and reverse speed position. As shown in FIG. 5, the selector lever is arranged for the positions park (P), reverse speed (AR), neutral (N), and forward speed (AV). In FIG. 5, the transmission and spool valve and linkages are substantially the same as those shown in FIG. 1, but to differentiate this modified form of the invention, corresponding components in FIG. 5 are preceded by the digit "1." For example, the selector lever 118 in FIG. 5 corresponds to selector lever 18 in FIG. 1. It should be noted that the gear 116, which corresponds to the gear 16 in FIG. 1 is positioned on the interior side of the gears 114 and 115 when the selector lever 118 is in the neutral and forward speed positions. The corresponding positions of the spool in the servo valve are also indicated in FIG. 5. Hydraulic fluid under pressure from the conduit 128 is supplied to the cylinder device 5 when the selector lever is in the position shown in FIG. 5.

Having now described my invention what I claim as new and desire to secure by letters patent is:

1. A transmission assembly comprising a coupling device, a friction speed variator including a hydraulic variator-actuating device and an input shaft connected to be driven by the coupling device and an output shaft, a gear integral with the input shaft and a gear integral with the output shaft, motion-reversing gear means capable of engaging the two gears for reverse speed operation of the assembly, and control means comprising valve means controlling the supply of fluid to the hydraulic actuating device and a manually-controlled selector lever which is connected to shift to actuate the motion-reversing gear means and shift said valve and is capable of occupying a plurality of positions comprising a neutral position, forward speed position, reverse speed position, the selector lever having an intermediate position through which intermediate position the selector lever passes in moving between the neutral position and the reverse speed position in which intermediate position the valve is brought to a position to bring the hydraulic actuating device into action.

2. A transmission assembly as claimed in claim 1, wherein the intermediate position of the selector lever is said forward speed position, the transmission assembly comprising means for preventing the selector lever from accidentally passing from said forward speed position to said reverse speed position.

3. A transmission assembly as claimed in claim 1, wherein said neutral position of the selector lever is between said forward speed position and said reverse speed position, the selector lever having between said neutral position and said reverse speed position a second intermediate position in which second intermediate position the valve is brought to a position to supply fluid to and bring into action the hydraulic actuating device.

* * * * *

UNITED STATES PATENT OFFICE
CERTIFICATE OF CORRECTION

Patent No. 3,793,897        Dated February 26, 1974

Inventor(s) Armand Froumajou

It is certified that error appears in the above-identified patent and that said Letters Patent are hereby corrected as shown below:

On Page 1, Column 1, the full and correct name of the assignees should read as follows:

AUTOMOBILES PEUGEOT, Paris; REGIE NATIONALE DES

USINES RENAULT, Billancourt, both of, France

Signed and sealed this 9th day of July 1974.

(SEAL)
Attest:

McCOY M. GIBSON, JR.
Attesting Officer

C. MARSHALL DANN
Commissioner of Patents